US006933344B2

(12) United States Patent
Shah et al.

(10) Patent No.: US 6,933,344 B2
(45) Date of Patent: Aug. 23, 2005

(54) THERMOPLASTIC ELASTOMERIC COMPOSITIONS AND METHODS OF PREPARING THERMOPLASTIC ELASTOMERIC COMPOSITIONS

(75) Inventors: Suresh Deepchand Shah, Troy, MI (US); Michael William Jary, Farmington Hills, MI (US); Ismat Ali Abu-Isa, Rochester HIlls, MI (US)

(73) Assignee: Delphi Technologies, Inc., Troy, MI (US)

( * ) Notice: Subject to any disclaimer, the term of this patent is extended or adjusted under 35 U.S.C. 154(b) by 449 days.

(21) Appl. No.: 10/245,792

(22) Filed: Sep. 16, 2002

(65) Prior Publication Data

US 2003/0052431 A1 Mar. 20, 2003

Related U.S. Application Data

(60) Provisional application No. 60/324,304, filed on Sep. 20, 2001.

(51) Int. Cl.[7] .................................................. C08L 52/02

(52) U.S. Cl. ......................... 525/99; 525/192; 525/197; 525/194

(58) Field of Search .......................... 525/99, 192, 194, 525/197

(56) References Cited

U.S. PATENT DOCUMENTS 6,153,680 A 11/2000 Shah et al.
6,593,002 B2 7/2003 Shah et al.

*Primary Examiner*—Jeffrey Mullis
(74) *Attorney, Agent, or Firm*—Scott A. McBain

(57) ABSTRACT

Thermoplastic elastomeric compositions and processes for preparing the compositions comprising a blend of polypropylene, styrene-ethylene butylene-styrene copolymer, ethylene-propylene-diene monomer elastomer, linear low density polyethylene, peroxide crosslinking agent and a crosslinking coagent. The peroxide crosslinking agent and crosslinking coagent provide a crosslinking system. The compositions improve melt strength and increase resistance to flow and tear. The composition may further comprise mineral oil, antioxidant, colorant, a processing aid and stabilizer and mixtures thereof. The processes for preparing thermoplastic elastomeric compositions are particularly useful in microcellular injection molding to form articles with improved surface characteristics.

25 Claims, 3 Drawing Sheets

THERMOPLASTIC ELASTOMERIC COMPOSITIONS AND METHODS OF PREPARING THERMOPLASTIC ELASTOMERIC COMPOSITIONS

CROSS REFERENCE TO RELATED APPLICATIONS

The present invention claims priority from U.S. Provisional Application Ser. No. 60/324,304 entitled "A Material Formulation to Improve the Appearance of Microcellular Elastomeric Foam," filed Sep. 20, 2001.

TECHNICAL FIELD

The present invention relates to thermoplastic elastomeric compositions and more specifically to thermoplastic elastomeric compositions with improved surface characteristics using a microcellular foaming process.

BACKGROUND OF THE INVENTION

Thermoplastic elastomeric materials are used in the fabrication of many articles. In the automotive field, thermoplastic elastomeric material compositions have been used for the fabrication of articles such as interior sheathing, including instrument panel skins, door panels, air bag covers, roof liners and seat covers.

Often, when thermoplastic elastomeric materials are injection molded, as in a microcellular foaming process, the resulting articles may have undesirable surface characteristics, such as surface blisters and/or surface dimpling. This blistering and dimpling often occurs when the article is being removed from the mold as a result of the low melt strength of the thermoplastic elastomeric materials. When the mold opens to release the article, the material composition of the article cannot contain the internal pressure. One reason for the low melt strength is that the glass transition temperature of the thermoplastic elastomer composition is far below room temperature. Thus, at high demolding temperatures the cell skin remains elastic and as a result may be unable to contain the internal gas pressure without deforming.

Therefore, one approach to reduce surface blistering and surface dimpling is by quenching the article, and thereby reducing the temperature of the article, during or immediately after demolding. This may cool down the polymer matrix and harden the polymer and limit flow and deformation of the article. However, this attempt may lead to inferior articles and adds an additional step to the manufacturing process. Another approach is to select a polymer melt containing a glassy polymer with a higher transition temperature than a typical polymer melt. However, this attempt may change the properties of the polymer matrix and may not yield an acceptable article in terms of performance and/or manufacturability. Another method to reduce or eliminate the surface blistering with the current thermoplastic elastomeric composition is to reduce the amount of gas introduced in the molding process. However, this attempt may limit the amount of packing, causing cell collapse resulting in surface dimpling.

Thus there exists a need in the art for a thermoplastic elastomeric formulation with improved melt strength which may eliminate surface blistering and/or dimpling and thus provide articles of manufacture with improved surface characteristics.

SUMMARY OF THE INVENTION

Thermoplastic elastomeric compositions and processes for preparing the same are provided comprising a polymer blend of about 5 to about 50 weight percent (hereinafter "wt. %") polypropylene or copolymers thereof, about 5 to about 40 wt. % styrene-ethylene butylene-styrene (SEBS) block copolymer, about 5 to about 40 wt. % ethylene-propylene-diene monomer (EPDM) elastomer, and about 2 to about 5 wt. % linear low density polyethylene (LLDPE); and about 1 to about 12 wt. % of a peroxide crosslinking agent and about 1 to about 8 wt. % of a crosslinking coagent. The weight percent values disclosed are based on the total composition unless otherwise noted.

In an alternate embodiment, the composition comprises up to about 40 wt. % mineral oil. Another embodiment further comprises up to about 3 wt. % antioxidant. In another embodiment, the composition further comprises up to about 3 wt. % colorant. A further embodiment comprises up to about 3 wt. % processing aid, such as zinc stearate. Another embodiment of the composition further comprises up to about 3 wt. % stabilizer, such as ultraviolet (UV) stabilizer.

In another embodiment, a process for the preparation of the thermoplastic elastomeric composition is provided comprising mixing about 5 to about 50 wt. % polypropylene or copolymers thereof, about 5 to about 40 wt. % styrene-ethylene-butylene-styrene (SEBS) block copolymer, about 5 to about 40 wt. % ethylene-propylene-diene monomer (EPDM) elastomer, and about 2 to about 5 wt. % linear low density polyethylene (LLDPE) to form a polymer blend; and about 1 to about 12 wt. % peroxide and about 1 to about 8 wt. % crosslinking coagent. The polymer blend and peroxide crosslinking agent and crosslinking coagent may be mixed to form a blend of the present composition. The composition may be disposed into an injection molding device to form a polymer melt.

In an alternative process, the mixing and disposing of the polymer blend with the peroxide crosslinking agent and crosslinking coagent may occur simultaneously at the hopper of the injection-molding machine by metering in the various ingredients into the hopper, thereby forming the present composition. The composition may be further processed to form a polymer melt.

In an additional embodiment, a process for the preparation of the thermoplastic elastomeric composition is provided, wherein the peroxide and crosslinking coagent, and the polymer blend of the foregoing composition are introduced into a device, such as an extruder. The peroxide and crosslinking coagent, and the polymer blend may be introduced at the hopper of the device. The peroxide crosslinking agent and crosslinking coagent may be mixed with the polymer blend using an extruder to melt the polymer blend and distribute and mix the ingredients forming a polymer melt. The polymer melt may be further processed as a through a die to form of a continuous round ribbon of the composition. The continuous round ribbon may then be cooled and pelletized to form pellets of the composition. The resulting pellets of the composition may then be formed into articles of manufacture using a microcellular injection molding process.

A further process is provided, in which the polymer blend is disposed into a device such as an extruder. The peroxide and coagent are introduced downstream, for instance at an extruder barrel, and mixed with the polymer blend. An extruder may be used to melt the polymer blend and distribute and mix the ingredients in the polymer melt. The polymer melt may be further processed, as through a die, to form a continuous round ribbon of the composition. The ribbon may then be cooled and pelletized to form pellets of the composition. The resulting pellets of the composition may then be formed into articles of manufacture using a microcellular injection molding process.

Each process may further comprise any of the following or combinations thereof of, up to about 40 wt. % mineral oil based on the total weight of the polymer blend, up to about 3 wt. % antioxidant, up to about 3 wt. % colorant, up to about 3 wt. % processing aid, such as zinc stearate, and up to about 3 wt. % stabilizer, such as ultraviolet (UV) stabilizer, In another embodiment, articles of manufacture prepared with the present compositions are provided.

These and other features and advantages of the present invention will be apparent from the following brief description of the drawings, detailed description and appended claims and drawings.

BRIEF DESCRIPTION OF THE DRAWINGS

Referring now to the drawings which are meant to be exemplary, not limiting.

DETAILED DESCRIPTION OF THE PREFERRED EMBODIMENT

Figure 1:
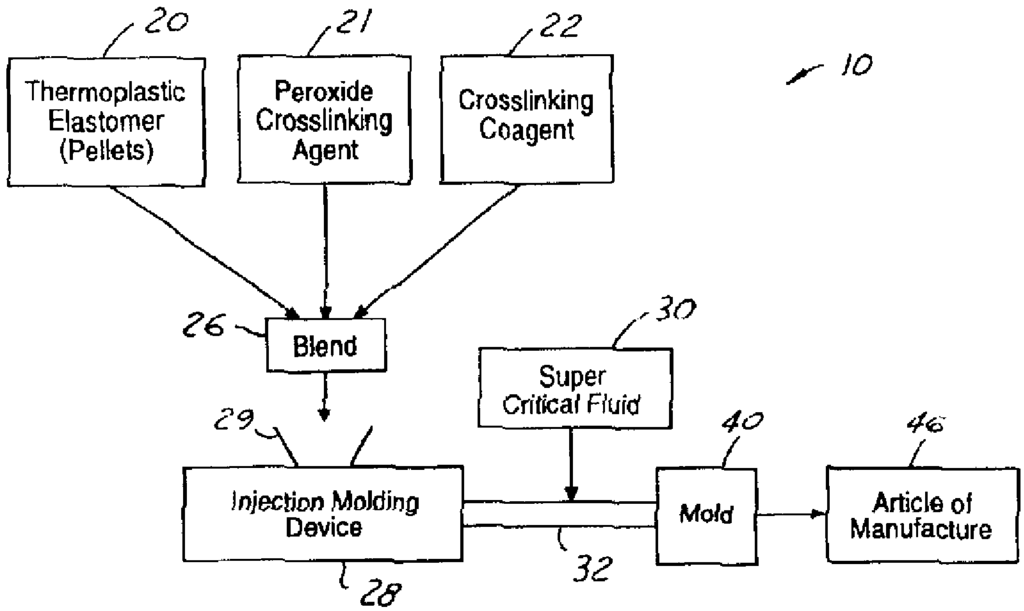
FIG. 1 is a schematic illustration of a process of preparing a thermoplastic elastomeric material composition and articles thereof in accordance with the present invention.

Described herein are thermoplastic elastomeric material compositions, processes for preparing the compositions and articles of manufacture prepared from the compositions. In one embodiment, a thermoplastic elastomeric composition is provided comprising a polymer blend of about 5 to about 50 weight percent (hereinafter "wt. %") polypropylene or copolymers thereof, about 5 to about 40 wt. % styrene-ethylene butylene-styrene (SEBS) block copolymer, about 5 to about 40 wt. % ethylene-propylene-diene monomer (EPDM) elastomer, and about 2 to about 5 wt. % linear low density polyethylene (LLDPE); and about 1 to about 12 wt. % peroxide crosslinking agent; and about 1 to about 8 wt. % crosslinking coagent.

In an alternate embodiment, the composition further comprises up to about 40 wt. % mineral oil. Another embodiment further comprises up to about 3 wt. % antioxidant. In another embodiment, the composition further comprises up to about 3 wt. % colorant. A further embodiment comprises up to about 3 wt. % processing aid, such as zinc stearate. Another embodiment of the composition further comprises up to about 3 wt. % stabilizer, such as ultraviolet (UV) stabilizer.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of reported significant digits and by applying ordinary rounding techniques.

Notwithstanding that the numerical ranges and parameters set forth the broad scope of the invention are approximations, the numerical values set forth in specific examples are reported as precisely as possible. Any numerical value, however, inherently contain certain errors necessarily resulting from the standard deviation found in their respective testing measurements.

The polypropylene component of the thermoplastic elastomeric composition comprises about 5 to about 50 wt. %, preferably about 25 to about 40 wt. %, polypropylene. Suitable polypropylene includes, but is not limited to, semi-crystalline polypropylene homopolymer, and is intended to include in addition to the homopolymer those polymers that also contain minor amounts, usually not greater than about 15 wt. % based on the total weight of polypropylene, of other olefin monomers, for example, ethylene, butene, octene, and the like. The polypropylene polymers useful in the present invention have melt flow indices in the range of about 60 to about 120 grams/10 minutes (g/10.) measured at 230° C. employing a 2.16 kilogram (kg) weight.

The thermoplastic elastomeric compositions further comprise about 5 to about 40 wt. %, preferably about 15 to about 30 wt. %, styrene-ethylene-butylene-styrene (SEBS) block copolymer. Suitable SEBS copolymers include those with a block styrene content of about 10 to about 35 wt. % based on the total SEBS copolymer, and have Shore A hardness values of about 40 to about 80.

The thermoplastic elastomeric compositions further comprise about 5 to about 40 wt. %, preferably, about 15 to about 30 wt. %, ethylene propylene non-conjugated diene elastomer (EPDM). The non-conjugated dienes may contain about 6 to about 22 carbon atoms and have at least one readily polymerizable double bond. The ethylene propylene copolymer elastomer contains about 60 to about 80 wt. %, usually about 65 to about 75 wt. %, ethylene, based on the total weight of the EPDM. The amount of non-conjugated diene is generally about 1 to about 7 wt. %, usually about 2 to about 5 wt. %, based on the total weight of the EPDM. Suitable EPDM elastomer include, but are not limited to ethylene propylene-1,4 hexadiene, ethylene propylene dicyclopentadiene, ethylene propylene norbornene, ethylene propylene-methylene-2-norbornene, and ethylene propylene-1,4-hexadiene/norbornadiene copolymers.

The thermoplastic elastomeric compositions comprise about 2 to about 5 wt. % linear low density polyethylene (LLDPE). Suitable linear low density polyethylene compounds generally have melt indices of about 0.5 to about 5.0 g/10 min. measured at 230° C. employing 2.16 kilogram (kg) weight. Within this range, the melt indices are preferably greater than or equal to about 0.5 g/10 min. measured at 230° C. employing 2.16 kilograms (kg) weight. Also within this range, the melt indices are preferably less than or equal to about 2.0 g/10 min. measured at 230° C. employing 2.16 kilogram (kg) weight, and more preferably less than or equal to about 1.0 g/10 min. measured at 230° C. employing 2.16 kilogram (kg) weight.

The thermoplastic elastomeric compositions also comprise about 1 to about 12 wt. %, preferably about 2 to about 6 wt. %, peroxide crosslinking agent and about 1 to about 8 wt. %, preferably about 1 to about 4 wt. %, crosslinking coagent. The peroxide crosslinking agent and the crosslinking coagent comprise a crosslinking system, which may increase the melt strength, tear properties and resistance to flow of the composition. Suitable peroxides include, but is not limited to, dicumyl peroxide (DI-Cup), or α-α-bis (t-butylperoxy) diisopropyl benzene (Vul-Cup). These peroxides may be absorbed on clay, to be supplied in powder form, for easy mixing with other ingredients of the polymer composition. The coagent is added along with the peroxide to increase the rate of the crosslinking reaction. Suitable crosslinking coagent components may be of the type such as Tri-methylolpropane trimethacrylate (TMPT), m-phenylene dimaleimide (HVA-2), triallyl cyanurate (TAC), or triallyl isocyanurate (TAIC).

The peroxide crosslinking agent and the crosslinking coagent comprise a crosslinking system, which may promote crosslinking between the elastomeric components, and thereby increase the melt strength, and resistance to flow and tear of the composition. The coagent may attach itself on free radicals generated on different chains of the polymer matrix by the peroxide, to enhance crosslinking rather than disproportionation or termination reactions. Therefore, the presence of the coagent may increase the molecular weight of the rubbery phase, and at the same time encourage molecular weight build up in polypropylene through crosslinking rather than allow oxidation and chain scissioning of the polymer if only peroxide is present.

Optionally, the thermoplastic elastomeric compositions may further comprise up to about 40 wt. %, preferably about 15 to about 30 wt. %, mineral oil. Suitable mineral oil includes paraffinic oils (ASTM D2226 type 104), aromatic oils (ASTM type 101&102), or naphthenic oils (ASTM 103 & 104A). Paraffinic oils are characterized by low aromatic hydrocarbon content of 5 to 30% by weight, whereas aromatic oils can contain up to 90 wt. % aromatics. Naphthenic oils on the other hand contain cyclic hydrocarbons (naphthenes) and are characterized by good low temperature properties. All above oils represent different cuts from the distillation of crude oil.

In addition, the thermoplastic elastomeric compositions may comprise up to about 3 wt. %, preferably about 1 wt. %, antioxidant. Suitable antioxidant includes hindered phenols, thiocompounds, amines or phosphites.

The thermoplastic elastomeric compositions also may comprise up to about 3 wt. % colorant. Suitable color pigments are known to those skilled in the art and the exact amount of color pigment is readily empirically determined based on the desired color characteristic of the composition and the finished product.

The thermoplastic elastomeric compositions may also comprise up to about 3 wt. %, preferably about 1 wt. %, of a processing aid such a metal stearate, soaps or lubricants, in order to assist proper flow of the polymer melt through the injection molder barrel and dies and result in molded parts with good surface characteristics. A suitable example is zinc stearate.

The thermoplastic elastomeric compositions may also optionally comprise stabilizers, such as heat stabilizer and/or light stabilizer, such as ultraviolet light stabilizers, as well as combinations of heat and light stabilizers. Heat stabilizers, like antioxidants, include phenolics, amines, phosphites, and the like, as well as combinations comprising at least one of the foregoing heat stabilizers. Light stabilizers include low molecular weight (having number-average molecular weights less than about 1,000 AMU) benzophenones or hindered amines, high molecular weight (having number-average molecular weights greater than about 1,000 AMU) hindered amines, benzotriazoles, hydroxyphenyl triazines, and the like, as well as combinations comprising at least one of the foregoing light stabilizers. Optionally, various additives known in the art may be used as needed to impart various properties to the composition, such as heat stability, stability upon exposure to ultraviolet wavelength radiation, long-term durability, and processability. The exact amount of stabilizer is readily empirically determined by the reaction employed and the desired characteristics of the finished article, with up to about 3 wt. % possible, 1 wt. % preferred.

The present compositions may be used in a microcellular foaming process to produce articles of manufacture for automotive and non-automotive application. A microcellular injection molding process utilizes a Super Critical Fluid (SCF) that is introduced into a polymer melt in an injection molding barrel. Subsequently, the polymer melt is injected into the mold, and the pressure difference between the mold and the injection molding barrel may initiate the microcellular foaming which fills and packs the mold, thereby providing an article of manufacture upon demolding.

Super Critical Fluids (SCF) are formed when gases are cooled below their critical temperature and compressed to a pressure that allows the existence of the gas and the liquid in a single undistinguishable phase. Super critical fluids could be made of many gases including nitrogen, carbon dioxide, helium, hydrogen, carbon monoxide, ethane, methane, or ammonia. Choosing among these fluids is determined by the specific application.

Turning now to FIG. 1, the thermoplastic elastomeric compositions and articles formed thereof may be prepared in a process referred to as reference numeral 10. In the present process 10, the polymer blend comprised of a thermoplastic elastomer 20 material, in pellet form, is pre-mixed with the peroxide 21 and crosslinking coagent 22 using a dry tumbler mixer or other such device to form a tumble mixed blend 26 of the composition prior to being disposed into the hopper 29 of the injection molder 28, such as an injection molding machine. Once in the injection molder 28 the tumble mixed blend 26 forms a polymer melt which passes into the injection molding barrel 32.

Within the injection molding barrel 32, the super critical fluid 30, such as nitrogen or carbon dioxide, is introduced to the polymer melt, and continues on into a mold 40. The pressure difference between the injection molding barrel 32 and the mold 40 may initiate the microcellular foaming which allows the polymer melt to fill and pack the mold 40 thereby producing a microcellular foamed molded article of manufacture 46.

Figure 2:
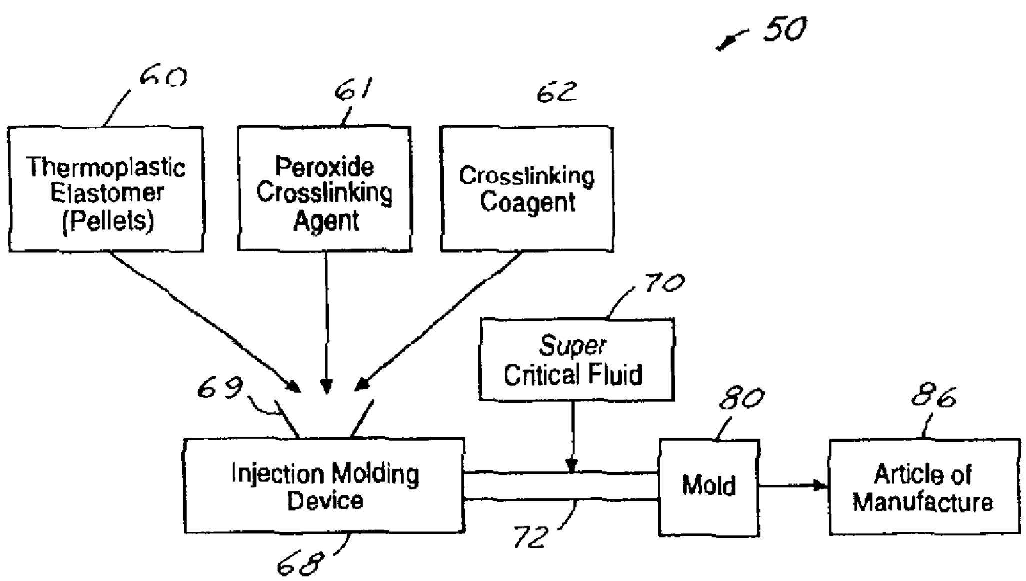
FIG. 2 is a schematic illustration of an alternate process of preparing a thermoplastic elastomeric material composition and articles thereof in accordance with the present invention.

As shown in FIG. 2, an alternate process, referred to as reference numeral 50, illustrates the process 50 of disposing the polymer blend comprised of a thermoplastic elastomer 60 in pellet form, peroxide crosslinking agent 61 and crosslinking coagent 62 directly into the hopper 69. In this process 50, gravimetric feeders or other such device may be used to dispose of the thermoplastic elastomer 60, peroxide crosslinking agent 61 and crosslinking coagent 62 into the injection molder 68. The method of disposing of the components into the injection-molding device is determined by the desired application and available mechanical apparatus.

Once within the injection molder 68, the thermoplastic elastomer 60, peroxide crosslinking agent 61, and crosslinking coagent 62 form a polymer melt which passes into an injection molding barrel 72. A Super Critical Fluid 70 is introduced into the polymer melt in the injection molding barrel 72. The polymer melt and super critical fluid 70 pass into the mold 80. The pressure difference between the injection molding barrel 72 and the mold 80 may initiate the microcellular foaming process, thereby filling and packing the mold 80 and providing an article of manufacture 86 upon demolding.

In both the processes 10, 50 shown in FIG. 1 and FIG. 2, as the mixture of thermoplastic elastomer 20, 60, peroxide crosslinking agent 21,61, and crosslinking coagent 22, 62 is plasticated in the barrel 32, 72, forming a polymer melt, a super critical fluid 30,70 is injected into the melt through the barrel 32,72. The crosslinking process may begin at the end of the injection molding barrel 32,72 at high temperature just prior to entering the mold 40, 80. The start of the crosslinking process may be controlled by adjusting the injection molding barrel 32, 72 zone temperature. Zone temperatures in the injection molding device may vary between 150° C. and 200° C. The crosslinking reaction may be delayed by using inhibitors, such as hydroquinone, as determined by the desired application.

Figure 3:
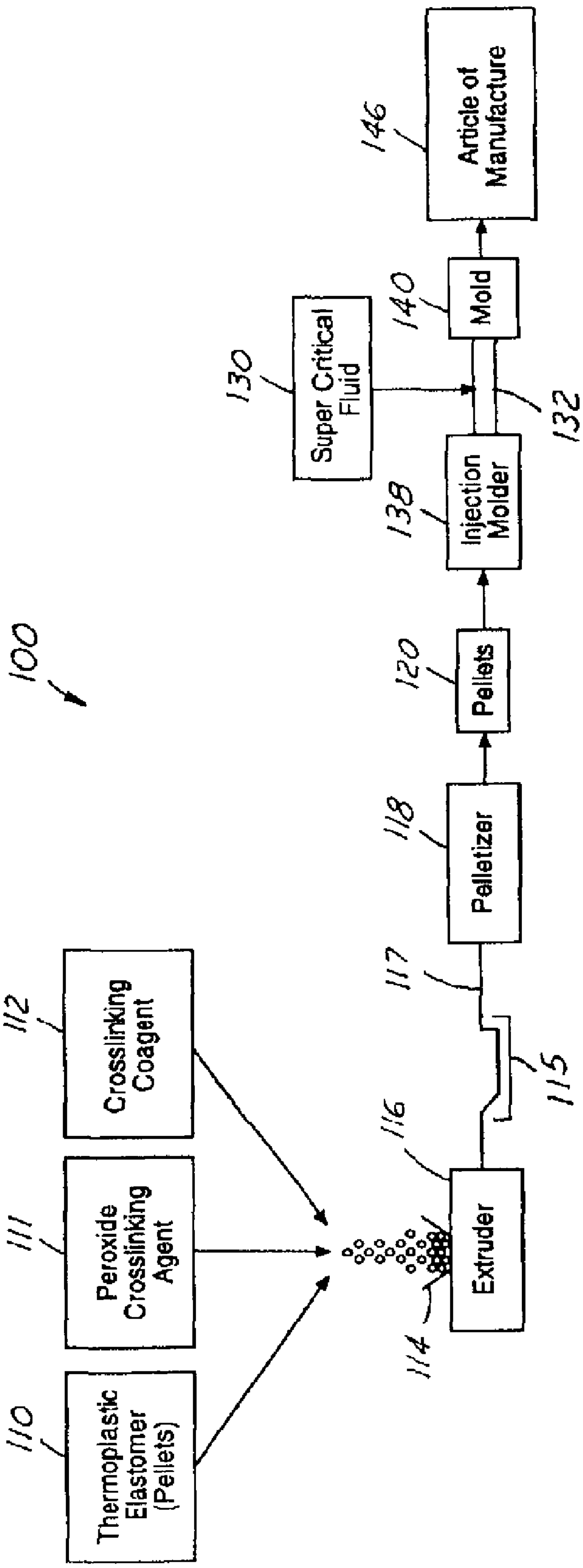
FIG. 3 is a schematic illustration of an additional process of preparing a thermoplastic elastomeric composition and articles thereof in accordance with the present invention.

In an alternative process, referred to as reference numeral 100, shown in FIG. 3, the thermoplastic elastomeric composition of the present invention may be prepared in a process which may result in a certain degree of crosslinking in pellet form which is directly injection molded for the microcellular process. This embodiment 100 comprises mixing the polymer blend comprised of a thermoplastic elastomer 110 with the peroxide crosslinking agent 111 and a crosslinking coagent 112, preferably a vulcanizing coagent, using an extruder 116, such as twin screw extruder or any other suitable dispersive/distributive melt mixer to form a blend. The peroxide crosslinking agent 111 and crosslinking coagent 112 are mixed with the thermoplastic elastomer 110 at the hopper 114 hopper, as shown in FIG. 3, to prevent premature crosslinking and also help control the desired degree of cross-linking. The blend, after extrusion and cooling in a cooling trough 115 to solidify forming an extruded ribbon 117 of the present composition, may then be processed in a pelletizer 118 to form pellets 120.

In this process 100, a degree of crosslinking reaction occurs in the pellet 120 of the present composition. As shown further in FIG. 3, the pellets 120 may be processed in an injection molder 138 to form a polymer melt which passes into an injection molding barrel 132. A super critical fluid 130 is injected into the polymer melt within the injection molding barrel 132, and the formulation passes into a mold 140. Upon demolding, an article of manufacture 146 is provided.

Figure 4:
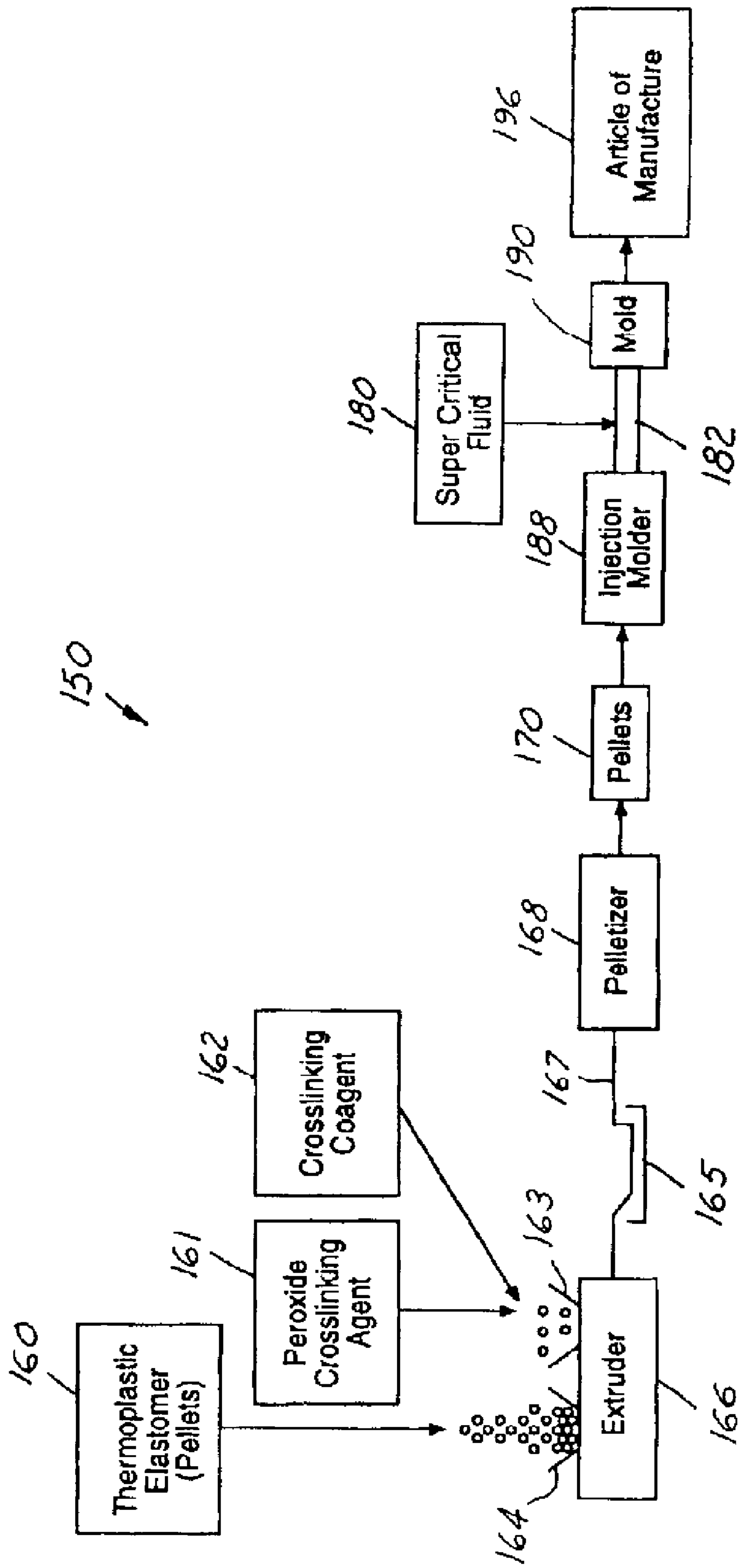
FIG. 4 is a schematic illustration of a process for preparing a thermoplastic elastomeric material composition and articles thereof in accordance with the present invention.

In an alternate embodiment, a process referred to as reference numeral 150, is shown in FIG. 4. In this embodiment 150, the polymer blend comprised of a thermoplastic elastomer 160 may be disposed into an extruder 166 at the hopper 164 of the extruder 166. A peroxide crosslinking coagent 161 and crosslinking coagent 162 may be added to the thermoplastic elastomer 160 at a downstream port 163 on the extruder 166. The blend may then be processed within the extruder 166 and cooled, as in a cooling trough 165 to form extruded ribbon 167 of the present composition. The extruded ribbon 167 may be processed further in a pelletizer 168 to form pellets 170 of the present composition.

In this process 150, a degree of crosslinking reaction occurs in the pellet 170 of the present composition. As shown further in FIG. 4, the pellets 170 may be processed in an injection molder 188 to form a polymer melt which passes into an injection molding barrel 182. A super critical fluid 180 is injected into the polymer melt within the injection molding barrel 182, and the formulation passes into a mold 180. Upon demolding, an article of manufacture 196 is provided.

Often, upon demolding, articles prepared with current thermoplastic elastomeric compositions may show surface blisters and/or surface dimpling. Thermoplastic elastomeric compositions with improved melt strength may better sustain the pressure and heat factors of a molding process and thereby produce articles with less surface blistering and surface dimpling. Introducing a crosslinking system may increase the tear strength, tear properties and resistance to flow of the thermoplastic elastomeric composition.

The composition of the present invention comprises a crosslinking system of peroxide crosslinking agent and crosslinking coagent. The peroxide crosslinking agent generates free radicals on the polymer chain. The crosslinking coagent encourages the free radicals to crosslink the polymer matrix, thereby increasing the molecular weight of the elastomeric phase of the polymer matrix, without oxidizing the polymer and decreasing the molecular weight of the polymer. The peroxide and coagent crosslinking system may also provide an effective curing system and does not require the presence of unsaturation or double bonding in the polymer chain.

The crosslinking process may begin at the end of the barrel at high temperature just before entering the mold. Initially, the rate of crosslinking may be controlled by adjusting the barrel zone temperature. Additionally, the crosslinking may be delayed by using various inhibitors, such as hydroquinone. After the thermoplastic elastomeric composition is injected into the mold, the pressure difference between the barrel and the mold initiates the microcellular foaming, which fills and packs the article of manufacture.

The embodiments of the present compositions, processes and articles made there from, although primarily described in relation to vehicle applications such as interior sheathing, including instrument panel skins, door panels, air bag covers, roof liners, and seat covers, may be utilized in numerous applications, both automotive and nonautomotive.

It will be understood that a person skilled in the art may make modifications to the embodiments shown herein within the scope and intent of the claims. While the present invention has been described as carried out in specific embodiments thereof, it is not intended to be limited thereby but is intended to cover the invention broadly within the scope of the claims.

What is claimed is:

1. A composition comprising, based on the weight of the total composition:

a polymer blend comprising about 5 to about 50 wt. % polypropylene or copolymer thereof, about 5 to about 40 wt. % styrene-ethylene butylene-styrene block copolymer, about 5 to about 40 wt. % ethylene-propylene-diene monomer elastomer, and about 2 to about 5 wt. % linear low density polyethylene;

about 1 to about 12 wt. % peroxide crosslinking agent; and about 1 to about 8 wt. % crosslinking coagent.

2. The composition of claim 1, further comprising about 25 to about 40 wt. % of the polypropylene.

3. The composition of claim 1, comprising about 15 to about 30 wt. % of the styrene-ethylene butylene-styrene block copolymer.

4. The composition of claim 1, comprising about 15 to about 30 wt. % of the ethylene-propylene-diene monomer elastomer.

5. The composition of claim 1, further comprising up to 40 wt. % mineral oil.

6. The composition of claim 1, further comprising up to 3 wt. % antioxidant.

7. The composition of claim 1, further comprising up to 3 wt. % colorant.

8. The composition of claim 1, further comprising up to 3 wt. % processing aid.

9. The composition of claim 1, further comprising up to 3 wt. % stabilizer.

10. The composition of claim 1, wherein the peroxide crosslinking agent is dicumyl peroxide.

11. The composition of claim 1, wherein the crosslinking coagent is trimethylolpropane trimethacrylate.

12. The composition of claim 1, wherein the crosslinking coagent is triallyl cyanurate.

13. The composition of claim 1, wherein the crosslinking coagent is triallyl isocyanurate.

14. The composition of claim 1, wherein the crosslinking coagent is m-phenylene dimaleimide.

15. An article of manufacture made from the composition of claim 1.

16. An article of manufacture made from the composition of claim 1, wherein the article of manufacture is selected from the group consisting of sheathing, instrument panel skins, air bag covers, roof liners, seat covers and door panels.

17. A process for preparing a composition comprising, based on the total weight of the composition:

mixing about 5 to about 50 wt. % polypropylene or copolymer thereof, about 5 to about 40 wt. % styrene-ethylene butylene-styrene block copolymer, about 5 to about 40 wt. % ethylene-propylene-diene monomer elastomer, and about 2 to about 5 wt. % linear low density polyethylene to form a polymer blend; and adding about 1 to about 12 wt. % of a peroxide crosslinking agent and about 1 to about 8 wt. % of a crosslinking coagent to said polymer blend to form a composition.

18. The composition of claim 17, wherein the step of mixing comprises mixing about 25 to about 40 wt. % of the polypropylene or copolymer thereof, about 15 to about 30 wt. % of the styrene-ethylene butylene-styrene block copolymer, about 15 to about 30 wt. % of the ethylene-propylene-diene monomer elastomer, and about 2 to about 5 wt. % of the linear low density polyethylene to form a polymer blend.

19. The process of claim 17, further comprising:

mixing at least one of the group consisting of up to about 40 wt. % mineral oil, up to about 3 wt. % antioxidant, up to about 3 wt. % colorant, up to about 3 wt. % processing aid, up to about 3 wt. % stabilizer, based on the total weight of the composition, and mixtures thereof, to said polymer blend.

20. The process of claim 17, comprising:

disposing the composition into an extruder;

extruding said composition; and processing said composition to form pellets of the composition.

21. The process of claim 17, comprising:

disposing the polymer blend into an extruder; and adding about 1 to about 12% of a peroxide crosslinking agent and about 1 to about 8% of a crosslinking coagent to said polymer blend downstream into said extruder to form a composition; and processing said composition to form pellets of the composition.

22. A microcellular foaming injection molding process for producing an article of manufacture comprising:

mixing about 5 to about 50 wt. % polypropylene or copolymer thereof, about 5 to about 40 wt. % styrene-ethylene butylene-styrene block copolymer, about 5 to about 40 wt. % ethylene-propylene-diene monomer elastomer, and about 2 to about 5 wt. % linear low density polyethylene to form a polymer blend;

adding about 1 to about 12 wt. % of a peroxide crosslinking agent and about 1 to about 8 wt. % of a crosslinking coagent to said polymer blend to form a composition;

disposing said composition into an injection molding device to form a polymer melt;

disposing the polymer melt into a barrel;

adding a super critical fluid to the polymer melt within the barrel;

disposing the polymer melt with super critical fluid into a mold; and forming an article of manufacture.

23. The process of claim 22, wherein the step of mixing comprises mixing about 25 to about 40 wt. % of the polypropylene or copolymer thereof, about 15 to about 30 wt. % of the styrene-ethylene butylene-styrene block copolymer, about 15 to about 30 wt. % of the ethylene-propylene-diene monomer elastomer, and about 2 to about 5 wt. % of the linear low density polyethylene to form a polymer blend.

24. The process of claim 22, comprising:

mixing at least one of the group consisting of up to about 40 wt. % mineral oil based on the total weight of the polymer blend, up to about 3 wt. % antioxidant, up to about 3 wt. % colorant, up to about 3 wt. % processing aid, up to about 3 wt. % stabilizer and mixtures thereof, based on the total weight of the composition, to said polymer blend.

25. The process of claim 22, comprising:

disposing the composition into an extruder;

processing said composition to form pellets of the composition;

disposing said pellets of the composition into said injection molding device to form a polymer melt.

* * * * *